July 12, 1966 D. L. WATROUS 3,260,916
OVERLOAD DETECTION MEANS
Filed March 21, 1963
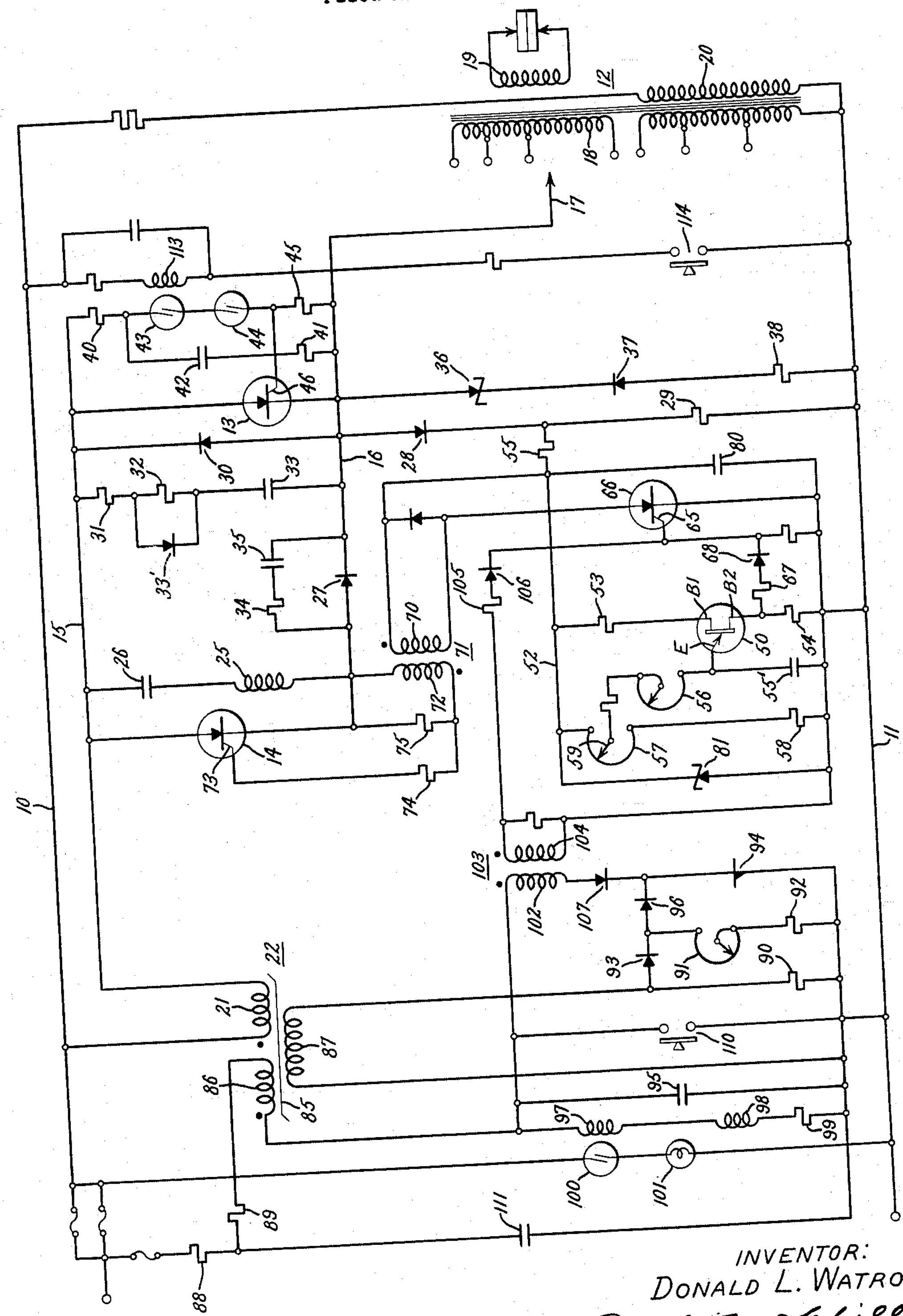
INVENTOR:
DONALD L. WATROUS,
BY David M. Schiller
ATTORNEY.

United States Patent Office 3,260,916

Patented July 12, 1966

3,260,916

OVERLOAD DETECTION MEANS

Donald L. Watrous, Scotia, N.Y., assignor to General Electric Company, a corporation of New York Filed Mar. 21, 1963, Ser. No. 266,903
17 Claims. (Cl. 321—13)

This invention relates to a power supply and has particular relation to overload detection means for effectively preventing operation of a pulse power supply when load current furnished by the power supply exceeds a predetermined value.

Pulse power supplies have previously been employed in a wide variety of applications for supplying power pulses to load devices. For example, pulse power supplies are employed in the welding field to supply power pulses to welding transformers. In many applications it is highly desirable that pulse power supplies be provided with overload detection means effective to monitor the load current supplied to the load and to terminate operation of the power supply when the load current exceeds a predetermined value. In welding applications, for example, a load current overload condition can occur if the welding electrodes are brought directly together, or if a workpiece shifts position to reduce the resistance of the secondary circuit to an abnormally low value.

Such overload detection means desirably should incorporate a minimum number of inexpensive parts which respond extremely rapidly to an overload condition to furnish one or more control signals. In certain applications, the power supply includes a static switch which when closed, supplies load current to a load. In such applications the overload detection means should be capable of opening the static switch in response to an overload condition before the load current rises to a level beyond the interrupting capabilities of the switch. It is further desirable that the overload detection means include parts which require very low operating power and which provide electrical isolation between the detection means and the circuits of the power supply. It is further desirable that the detection means have a fail-safe characteristic so that if current supplied to the detection means is interrupted, operation of the power supply is prevented. Previous designs of overload detection means for power supplies have failed to incorporate one or more of the above desirable features.

It is accordingly an important object of the present invention to provide a novel and improved overload detection means for a power supply which incorporates a minimum number of inexpensive parts and which responds very rapidly to an overload condition of load current.

It is another important object of the invention to provide a novel and improved overload detection means for a pulse power supply which operates to monitor load current and which responds very rapidly to an overload condition of such current to furnish a plurality of control signals to the power supply.

It is a further object of the invention to provide a novel and improved pulse power supply including overload detection means which responds very rapidly to an overload condition of load current to terminate operation of the power supply, and which has a fail-safe characteristic which prevents operation of the power supply in the event that the detection means is rendered inoperative.

It is still another object of the invention to provide a novel and improved pulse power supply including a static switch for supplying power to a load, a control circuit for closing the static switch, and overload detection means effective in response to an overload condition of current supplied to the load for rapidly furnishing separate control signals to disable the control circuit and for opening the static switch.

It is a still further object of the invention to provide a power supply as defined in the preceding object wherein the overload detection means includes parts which require very low operating power and which isolate the detection means from the power supply.

In carrying out the invention in one form the power supply includes a pair of electric valves supplied by current through power terminals and arranged so that a first valve when conducting supplies current to a load. A control circuit is provided to render the first valve conductive and a commutating circuit including the second valve is arranged so that when the second valve is rendered conductive, the first valve is rendered nonconducting. A timing circuit is connected to initiate a timing period in response to conduction of the first valve and after a preselected time, renders the second valve conductive to turn off the first valve. The improved overload detection means consists of means including a current transformer connected to monitor the current supplied to the first and second valves and to produce an output voltage which is a faithful reproduction of the magnitude of such current. A capacitor is connected to be charged in response to flow of a bias current which passes through a bias winding of the transformer, and a breakdown device is included in the discharge path for the capacitor to respond to the output voltage. The arrangement is such that the breakdown device is rapidly transferred from a nonconductive condition to a conductive condition when the monitored current attains a predetermined value at which time the capacitor discharges through the breakdown device. Separate control means are connected to respond to the discharge of the capacitor and to the breakdown of the breakdown device for furnishing the control signals effective respectively to disable the control circuit for preventing turn-on of the first valve and for rendering the second valve conductive to effect turn-off of the first valve.

Other objects and advantages of the invention will become apparent from the following description taken in conjunction with the accompanying drawing in which the single figure is a schematic representation of a pulse power supply incorporating overload protection means constructed in accordance with the present invention.

The overload detection means of the present invention is advantageously employed with pulse power supplies of the type described and claimed in copending application Serial Number 155,333, now Patent Number 3,233,116, filed November 28, 1961 by Donald L. Watrous and assigned to the assignee of the present invention. The single and multipulse power supplies there disclosed are particularly suited for welding applications and while the present invention is applicable to either the single or the multipulse supply, it will be described in connection with the single pulse supply.

The single pulse power supply includes power conductors 10 and 11 connected to any suitable source of direct current of the required potential, such as one hundred and twenty volts, the conductor 10 being at the more positive potential. In order to control the application of power from the conductors 10 and 11 to a load 12, shown in the form of a welding transformer, a switching circuit is provided including a pair of electric valves 13 and 14 which are preferably in the form of silicon controlled rectifiers including gate electrodes. Such rectifiers are well known and are effective to block the flow of current in the reverse direction until the avalanche voltage is reached, and also are effective to block the flow of current in the forward direction until the forward breakover voltage is attained. The rectifier can also be gated into a high conducting state when the forward voltage is less than the breakover voltage by application of a gating signal to the gate electrode. When a gating signal is applied, the rectifier will enter a high conducting state and will remain in such state even when the gating signal is removed until the forward current flow therethrough is interrupted or diverted. The rectifier is then effectively turned off and regains its forward blocking capabilities.

In order to control the application of power to the transformer 12 the rectifier or static switch 13 is connected across conductors 15 and 16 and is in series with an adjustable tap 17 for the primary winding 18 of transformer 12, the transformer 12 also having a secondary winding 19 and a bias winding 20 connected across the conductors 10 and 11. The conductors 16 is connected to conductor 11 through the tap 17 and through primary winding 18 whereas the conductor 15 is connected to conductor 10 through primary winding 21 of a current transformer 22 forming part of the overload detection means described hereinafter. Rectifier 13 is rendered conductive by means of a control circuit also described hereinafter.

In order to terminate conduction of rectifier 13 for terminating the power pulse supplied to transformer 12, a commutating circuit is provided including the controlled rectifier 14 which is connected across conductors 15 and 16. The commutating circuit also includes an oscillatory circuit which includes an inductor 25 and a capacitor 26 connected in series across the conductors 15 and 16 and in parallel with the rectifier 14. The charging path for capacitor 26 may be traced from conductor 10 through the primary winding 21, a part of conductor 15, capacitor 26, inductor 25, a diode 27 connected in conductor 16, a diode 28 and a resistor 29 to the conductor 11. A diode 30 is connected across conductors 15 and 16 in parallel with rectifier 13 and is included with diode 27 in a discharge path for capacitor 26. Resistors 31 and 32 and a capacitor 33 are connected in series across conductors 15 and 16 and in parallel with diode 30 and rectifier 13 to form a transient voltage suppressor. A diode 33′ is connected across resistor 32 to clamp the cathode of rectifier 13 to capacitor 33 to limit the rate at which the rectifier cathode voltage can fall. A resistor 34 and a capacitor 35 are connected across diode 27. Diode 28 and resistor 29 constitute a dummy load which permits the switching circuit to operate under all conditions of loading of transformer 12. In order to limit the reset rate of transformer 12 so that the rectifiers 13 and 14 will not be subject to excessive voltage, the series connection of a Zener diode 36, a diode 37 and a resistor 38 are connected across conductors 11 and 16 in parallel with the primary 18 of transformer 12.

To describe the operation of the commutating circuit let it be assumed that power is applied to conductors 10 and 11 and that neither of the rectifiers 13 and 14 is conducting. For this condition capacitor 26 is charged through its previously described charging path. When the rectifier 13 is rendered conductive by its control circuit as will presently appear, a power pulse is delivered through rectifier 13 to the primary winding 18 of transformer 12 until such time as rectifier 14 is rendered conductive in response to operation of the timing circuit hereinafter described. When rectifier 14 is rendered conductive, the oscillatory circuit begins oscillation and during the first half cycle of oscillation, the capacitor 26 is discharged through the rectifier 14 and inductor 25, the capacitor 26 then discharging during the second half cycle through inductor 25, diode 27 and diode 30. Discharge of capacitor 26 through diode 30 operates to apply a reverse voltage to both of the rectifiers 13 and 14 to thereby render the rectifiers nonconducting to terminate the application of a power pulse to the transformer 12. Rectifier 13 then remains in a nonconducting state until it is rendered conductive again by operation of its control circuit.

The control circuit for rendering rectifier 13 conductive includes resistors 40 and 41 and a capacitor 42 connected across conductors 15 and 16 in series, and contacts of a switch 43 connected in series with contacts of a switch 44 and a resistor 45, these series connected elements being in parallel with resistor 41 and capacitor 42. The switches 43 and 44 preferably comprise magnetic reed switches and are operated in a manner described hereinafter. The gate electrode 46 of rectifier 13 is connected between the switch 44 and resistor 45. Contacts of switch 43 are normally open and may be closed in any suitable manner to initiate a welding operation. Contacts of switch 44 are operated by the overload detection means and are held closed by the overload detection means until an overload occurs as will presently appear. When contacts of switch 43 are closed, capacitor 42 discharges through closed contacts of the switches 43 and 44 and resistors 45 and 41 to apply a gating pulse to rectifier 13 for turning rectifier 13 on.

In order to supply gating pulses to controlled rectifier 14 for rendering rectifier 14 conductive a predetermined time after rectifier 13 begins conducting, a control circuit is provided including a timing circuit and a pulse inhibit circuit which operate to render rectifier 14 conductive a predetermined adjustable time after rectifier 13 is rendered conductive. The timing and pulse inhibit circuits are described and claimed in application S.N. 271,400 filed April 8, 1963, by Donald L. Watrous and Frank Green and assigned to the assignee of the present invention. In the illustrated embodiment, the timing circuit includes a unijunction transistor 50 having two base electrodes B1 and B2 which are connected across conductors 11 and 52 through resistors 53 and 54. The conductor 52 is connected to a point between diode 28 and resistor 29 through a resistor 55. The control potential for the emitter E of the transistor 50 is supplied from an RC network consisting of a capacitor 55′, a variable resistor 56 and an adjustable portion of a calibrating potentiometer 57 all connected in series across the conductors 11 and 52. Potentiometer 57 is connected in series with a resistor 58 across conductors 11 and 52 and includes an adjustable tap 59 leading to the resistor 56. The emitter E is connected to a point between capacitor 55′ and resistor 56. When voltage is applied to conductors 11 and 52, capacitor 55 will charge through a portion of potentiometer 57, and resistor 56 and when the voltage on capacitor 55 reaches the peak point potential of emitter E, the transistor 50 will fire and capacitor 55′ will discharge through transistor 50 and resistor 54. The time delay period may be readily adjusted by varying the resistance of resistor 56.

At the end of the timing period the output voltage pulse appearing across resistor 54 is applied to the gate electrode 65 of a silicon controlled rectifier 66 through a resistor 67 and a diode 68 to render the rectifier 66 conductive. The rectifier 66 forms part of the pulse inhibit circuit and is connected in series with the primary winding 70 of an air core pulse transformer 71, the rectifier 66 and primary winding 70 being connected across conductors 11 and 52. Transformer 70 includes a secondary winding 72 connected to the gate electrode 73 of rectifier 14 through a resistor 74. A resistor 75 is in parallel with winding 72. In order to apply a gating pulse to gate electrode 73 of rectifier 14 in response to termination of the timing period, a capacitor 80 in the pulse inhibit circuit is connected across conductors 11 and 52 in parallel with rectifier 66 and primary winding 70. The timing and pulse inhibit circuits are connected across the dummy load resistor 29 for energization from voltage across the resistor 29 developed in response to energization of the primary winding 18 of transformer 12. The voltage impressed across these circuits is determined by a Zener diode 81 connected across the conductors 11 and 52. It is thus seen that the timing and pulse inhibit circuits are placed into operation in response to initiation of conduction of rectifier 13 by its control circuit and determine the width of the power pulse supplied by rectifier 13 to the transformer 12.

To describe the operation, when rectifier 13 is switched to a high conducting state, capacitors 55 and 80 become charged with capacitor 55′ charging at a rate slower than the charging rate of capacitor 80. After a preselected time determined by the time constant of the RC circuit, unijunction transistor 50 fires to effect discharge of capacitor 55′ through resistor 54 to thereby apply a gating pulse to gate 65 of rectifier 66 which is thus rendered conducting. When this occurs, capacitor 80 discharges through the primary 70 of pulse transformer 71 and through rectifier 66 whereby a voltage pulse is applied to gate 73 of rectifier 14 from the secondary winding 72 of the pulse transformer. Rectifier 14 is thus rendered conductive to initiate the commutating cycle for rendering rectifier 13 nonconductive to terminate the application of a power pulse to the primary 18 of transformer 12. The capacitor 80 and primary winding 70 form an oscillatory circuit and the design of capacitor 80 and transformer 71 is such that the oscillation is sufficiently damped so that the rectifier 66 remains conducting during the entire commutating cycle with the result that the capacitor 55′ cannot again be charged to fire transistor 50 during the commutating cycle. The generation of a second pulse by the timing circuit during the commutating cycle adversely affects operation of the circuit and in many cases will prevent turnoff of the rectifier 13. It is thus seen that the pulse inhibit circuit prevents the generation of more than one pulse by the timing circuit during the commutating cycle.

When the power pulse is removed from the transformer 12, the rectifier 66 is reset automatically to its nonconducting condition and the timing and pulse inhibit circuits are prepared to operate in response to application of the next power pulse to transformer 12. Provision of the pulse inhibit circuit additionally assures that a turn-on pulse of proper amplitude and width is coupled to the rectifier 14. The arrangement is such that the inductance of transformer 71 and the capacitance of capacitor 80 resonate to establish the width of the pulse produced by transformer 71 so that the pulse width is less than the period of conduction of rectifier 14 which is approximately thirty-five microseconds. This is a very advantageous result and prevents undesirable refiring of the rectifier 14 which could occur if the width of the turn-on pulse were greater than the period of conduction of rectifier 14. As will presently appear, the invention provides that a pulse generated by the overload detection means is applied to the rectifier 14 through the pulse inhibit circuit in the manner of the pulse generated by the timing circuit.

In accordance with the present invention a novel and improved overload detection circuit is provided for protecting the rectifier 13 and for preventing the application of power pulses to the transformer 12 in response to a current overload condition. The detection circuit includes a sensing portion which monitors the current supplied to the rectifier 13, and includes also a decision portion which operates when such current attains a predetermined value to generate a plurality of control pulses, a first pulse being effective to render the rectifier 14 conductive for initiating the commutating cycle, a second pulse being effective to disable the control or turn-on circuit for rectifier 13, and a third pulse being effective to operate a suitable indicating device. In the illustrated embodiment the sensing portion of the detection circuit includes the current transformer 22 having a magnetic core 85 preferably formed of a material having a high flux density, such as Deltamax. The primary winding 21 surrounds the core and is connected to the conductor 10 in the path for current supplied to rectifier 13. A pair of additional windings 86 and 87 surround the core 85, the winding 86 constituting a bias winding which, in the illustrated embodiment, is connected for energization from the conductors 10 and 11 through resistors 88 and 89 and through impedance means referred to hereinafter to establish a bias flux which places the core 85 in a condition of negative saturation in the absence of current in the primary winding 21. The winding 87 constitutes a secondary winding which has induced therein a voltage in response to energization of the primary winding 21. The secondary winding 87 has one of its terminals connected to conductor 11 and is across a resistor 90 which is connected across the series combination of a potentiometer 91 and a resistor 92 through a diode 93.

The decision portion of the overload protection circuit includes a breakdown device 94 which is preferably in the form of a PNPN diode, also known as a Shockley diode, and which is connected in the discharge path for a capacitor 95. The device 94 is of such a nature that it prevents the flow of appreciable current in the forward direction, which is in a downward direction in the drawing, until the anode-cathode voltage exceeds the breakdown voltage of the device. When this occurs, the device enters a high conduction state to freely pass current in a forward direction at which time the forward voltage across the device drops to a very low value. The breakdown voltage of the device is very stable and is substantially independent of temperature variations. The device remains in a high conduction state so long as current passing through it remains above a certain holding level. It can be appreciated that a breakdown device other than a PNPN diode can be employed such, for example, as a silicon controlled rectifier connected to breakdown in the forward direction in response to anode-cathode voltage instead of in response to a gating signal. A diode 96 is connected between the upper terminals of the potentiometer 91 and the breakdown device 94, the diode 96 being poled in the same direction as diode 93 and preventing the flow of bias current through potentiometer 91 and resistor 92 prior to breakdown of the device 94.

The overload detection means according to the invention includes one or more control signal producing means which are connected to be actuated in response to breakdown of the device 94 and resulting discharge of capacitor 95 to furnish control signals to open the static switch 13 and prevent the application of load current pulses to the transformer 12. In the illustrated embodiment the control signal producing means includes a pair of magnetic reed switch relays having respectively control windings 97 and 98 which are connected in series with a resistor 99 and which respectively surround reed switches 100 and 44, these switches having contacts which are closed when the windings 97 and 98 are energized. As previously pointed out the contacts of switch 44 are connected in series with the contacts of switch 43 in the turn-on or control circuit, and the contacts of switch 100 are connected in series with a suitable overload indicator such as a neon lamp 101. The windings 97 and 98 and the resistor 99 constitute impedance means connected across the capacitor 95 and in series with the bias winding 86, the impedance means thus being continuously energized by bias current so that the windings 97 and 98 hold their associated contacts in a closed condition prior to breakdown of the device 94. The impedance means also serves the additional function of developing a voltage in response to the continuous energization thereof which effects charging of the capacitor 95. As will appear hereinafter, the bias current through the windings 97 and 98 is diverted therefrom in response to breakdown of the device 94 which results in deenergization of the windings 97 and 98 and resultant opening of the contacts of switches 44 and 100.

In the present invention additional control signal producing means is connected to respond to discharge of the capacitor 95 to furnish a signal which operates to render the rectifier 14 conductive which initiates the commutating cycle to render the rectifier 13 nonconductive. For this purpose the primary winding 102 of an air core transformer 103 is connected in the discharge path of capacitor 95 and when the capacitor discharges, current through the winding 102 causes voltage to be induced in the secondary winding 104 of transformer 103, such induced voltage being coupled to the gate 65 of the controlled rectifier 66 in the pulse inhibit circuit. For this purpose the winding 104 is connected to the gate 65 of rectifier 66 through a resistor 105 and a diode 106. A diode 107 is connected between the device 94 and the winding 102 and is poled in such a direction as to decouple the capacitor 95 from the sensing portion of the overload detection circuit so that a time delay is not introduced in the breakdown of device 94.

To describe operation of the overload detection circuit let it be assumed that voltage is applied to conductors 10 and 11 and that both rectifiers 13 and 14 are nonconducting. For this condition bias current flows through bias winding 86 and generates magnetic flux which places the core of current transformer 22 in a condition of negative saturation since load current is not flowing through primary winding 21 at this time. In addition, the bias current also flows through the windings 97 and 98 so that these windings are energized and the associated reed switch contacts are closed. The voltage developed across the impedance means comprising windings 97 and 98 and resistor 99 by bias current flowing therethrough charges the capacitor 95 to a voltage which is selected to be less than the breakdown voltage of the device 94.

In order to initiate a welding operation, switch 43 is closed in a manner to be described which renders rectifier 13 conductive to thereby supply load current to transformer 12. Flux produced by load current flowing in winding 21 drives the magnetic core of transformer 22 towards positive saturation to induce voltage in the secondary winding 87. The transformer 22 is designed so that its core does not saturate during load current pulses and so that the magnitude of current resulting from voltage induced in the winding 87 is substantially proportional to the magnitude of load current in the primary winding 21. The current produced by voltage induced in winding 87 flows through two paths, one of which includes the resistor 90 and the other of which includes the diode 93, potentiometer 91 and resistor 92 in series. The ratio of the impedances in the two current paths is such that substantially all of the secondary current flows through the latter path, the voltage drop developed across potentiometer 91 and resistor 92 having a magnitude substantially proportional to the magnitude of the load current energizing the primary winding 21.

In the event that voltage developed across potentiometer 91 and resistor 92 exceeds the breakdown voltage of device 94, indicating an overload condition of load current, the device 94 rapidly transfers from a high impedance, nonconducting condition to a low impedance, high conducting condition. By adjusting the potentiometer 91 the level of the load current at which the device 94 breaks down can be varied over a substantial range. When device 94 breaks down, capacitor 95 discharges through primary winding 102 of transformer 103, diode 107 and device 94. The discharge current flowing through winding 102 results in induction of a voltage pulse in secondary winding 104 which is coupled to the gate 65 of controlled rectifier 66 to render the rectifier 66 conductive which causes capacitor 80 to discharge through the primary winding 70 of transformer 71. A voltage pulse is thus induced in secondary winding 72 which is applied to the gate 37 of rectifier 14 to render rectifier 14 conductive for initiating the commutating cycle. It has been demonstrated by test that the rectifier 66 is rendering conducting about two microseconds after the device 94 breaks down, and that rectifier 14 is rendered conducting approximately two microseconds after conduction of rectifier 66 is initiated.

When the device 94 breaks down, the bias current flowing through the switch windings 97 and 98 is diverted therefrom through the device 94 with the result that the contacts of reed switches 44 and 100 are opened. Opening of contacts of switch 44 effectively disables the control circuit so that the controlled rectifier 13 cannot be rendered conductive in response to closure of contacts of switch 43. Opening of contacts of switch 100 causes the neon lamp 101 to be extinguished. If desired, lamp 101 may be connected in parallel with switch 100 and in series with a resistor so that the lamp is lit when switch 100 opens. Breakdown of device 94 also results in the secondary current produced by voltage induced in the winding 87 being diverted through the device 94, and this current plus the diverted bias current operates to hold the device 94 in a high conducting state. The value of the bias current is selected to be larger than the holding current for the device 94 so that device 94 is held in a high conducting state throughout the interval of the load current pulse. When the load current pulse is terminated, the bias current flowing through bias winding 86 operates to reset the core of transformer 22 to a negative saturated condition.

In order to render the device 94 nonconducting for resetting the overload detection circuit a normally open switch 110 is connected in series with the bias winding 86 and in parallel with the impedance means consisting of windings 97 and 98 and resistor 99. Momentary closure of switch 110 in any suitable manner is effective to interrupt current flow through device 94 for rendering the device nonconducting and restoring the circuit to its normal condition.

Capacitor 95 and the inductance of transformer 103 form a resonant circuit the discharge frequency of which is made high, such as fifty kilocycles per second, so that a minimum delay occurs between the breakdown of device 94 and the generation of the voltage pulse in the secondary winding 104. The detection circuit is also failsafe in that interruption of bias current for any reason results in opening of the contacts of the several reed switches. A capacitor 111 is connected between conductor 11 and a point between resistors 88 and 89, capacitor 111 and resistor 88 forming a filter circuit which limits the rate of application of bias voltage to prevent undesired oscillations in the detection circuit.

As previously stated, initiation of a welding operation is effected by closing switch 43 in the control circuit. In the illustrated embodiment, switch 43 is in the form of a magnetic reed switch and is closed in response to energization of a control winding 113 surrounding the reed switch. The winding 113 is connected for energization from conductors 10 and 11 through a normally open switch 114, which may be a manually actuated push button switch, the switch 114 when actuated closed effecting energization of winding 113 to close switch 43.

While I have shown and described particular embodiments of my invention, it will be obvious to those skilled in the art that various changes and modifications may be made without departing from my invention in its broader aspects, and I, therefore, intend in the appended claims to cover all such changes and modifications as fall within the true spirit and scope of my invention.

What I claim as new and desire to secure my Letters Patent of the United States is:

1. An overload detection circuit comprising, a current transformer having a magnetic core, a primary winding on the core adapted to be energized by current to be sensed, and a secondary winding on the core; a capacitor, first impedance means across the capacitor for producing a voltage to charge the capacitor, second impedance means connected to said secondary winding for producing a voltage when traversed by current resulting from voltage induced in the secondary winding in response to current flow in the primary winding, a breakdown device across said second impedance means included in the discharge path for said capacitor, said breakdown device being transferred from a nonconducting condition to a conducting condition to effect discharge of said capacitor when the voltage produced by said second impedance means attains a predetermined value, and means for producing a control signal in response to discharge of said capacitor.

2. A circuit as defined in claim 1 wherein said second impedance means includes a potentiometer adjustable to vary the value of current to be sensed at which the breakdown device is transferred to a conducting condition.

3. An overload detection circuit comprising, a current transformer having a magnetic core, a primary winding on the core adapted for energization by current to be sensed, a bias winding on the core adapted to be energized by a bias current for effecting saturation of said core in the absence of current in said primary winding, and a secondary winding on said core; a capacitor, first impedance means connected across said capacitor in series with said bias winding for energization by bias current for producing a voltage to charge said capacitor, second impedance means connected to said secondary winding for producing a voltage when traversed by current resulting from voltage induced in said secondary winding in response to current in said primary winding, a breakdown device across said second impedance means and included in the discharge path for said capacitor, said breakdown device being transferred from a nonconducting condition to a conducting condition to effect discharge of said capacitor when voltage produced by said second impedance means attains a predetermined value, and means for producing a control signal in response to discharge of said capacitor.

4. An overload detection circuit comprising, a current transformer having a magnetic core, a primary winding on the core adapted for energization by current to be sensed, a bias winding on the core adapted to be energized by a bias current for effecting saturation of said core in the absence of current in said primary winding, and a secondary winding on said core; a capacitor, first impedance means connected across said capacitor in series with said bias winding for energization by bias current for producing a voltage to charge said capacitor, second impedance means connected to said secondary winding for producing a voltage when traversed by current resulting from voltage induced in said secondary winding in response to current in said primary winding, a breakdown device across said second impedance means and included in the discharge path for said capacitor, said breakdown device being transferred from a nonconducting condition to a conducting condition to effect discharge of said capacitor when voltage produced by said second impedance means attains a predetermined value, means for producing a control signal in response to discharge of said capacitor, said breakdown device remaining in a conducting condition when traversed by current having a magnitude greater than the holding current for said device, said bias current being diverted away from said first impedance means through said breakdown device when said device is transferred to a conducting condition, the magnitude of said bias current being selected to be greater than the holding current of said device, and reset means including a switch connected in series with said bias winding and in parallel with said first impedance means effective when closed to interrupt bias current flow through said device.

5. An overload detection circuit comprising, a current transformer having a magnetic core, a primary winding on the core adapted for energization by current to be sensed, a bias winding on the core adapted to be energized by a bias current for effecting saturation of said core in the absence of current in said primary winding, and a secondary winding on said core; first impedance means including control means connected in series with said bias winding for energization by bias current, second impedance means connected to said secondary winding for producing voltage from current resulting from voltage induced in said secondary winding in response to current in said primary winding, and a breakdown device across said second impedance means, said breakdown device being transferred from a non-conducting condition to a conducting condition when voltage produced by said second impedance means attains a predetermined value, said bias winding being connected to said breakdown device so that bias current is diverted away from said control means through said breakdown device to change the condition of said control means for producing a control signal in response to transfer of said breakdown device to a conducting condition.

6. A circuit as defined in claim 5 wherein said control means comprises a coil of a magnetic read switch having contacts to be connected in a control circuit, said contacts being held normally closed by bias current flowing through said coil and being opened in response to transfer of said breakdown, device to a conducting condition.

7. An overload detection circuit comprising, a current transformer having a magnetic core, a primary winding on the core adapted for energization by current to be sensed, a bias winding on the core adapted to be energized by a bias current for effecting saturation of said core in the absence of current in said primary windings, and a secondary winding on said core; first impedance means including control means connected in series with said bias winding for energization by bias current, second impedance means connected to said secondary winding for producing voltage from current resulting from voltage induced in said secondary winding in response to current in said primary winding, a breakdown device across said second impedance means, said breakdown device being transferred from a non-conducting condition to a conducting condition when voltage produced by said second impedance means attains a predetermined value, said bias winding being connected to said breakdown device so that bias current is diverted away from said control means through said breakdown device to change the condition of said control means for producing a control signal in response to transfer of said breakdown device to a conducting condition, said breakdown device remaining in a conducting condition when traversed by current having a magnitude greater than the holding current for said device, the magnitude of said bias current being selected to be greater than the holding current of said device, and reset means including a switch connected in series with said bias winding and in parallel with said first impedance means effective when closed to interrupt bias current flow through said device.

8. An overload detection circuit comprising, detecting means adapted for energization by current to be sensed to produce an output voltage having a magnitude substantially proportional to the magnitude of the current to be sensed, a capacitor, impedance means including control means across said capacitor, a breakdown device connected in the discharge path for said capacitor and connected to respond to said output voltage, said breakdown device being transferred from a nonconducting condition to a conducting condition to effect discharge of said capacitor when said output voltage attains a predetermined value, and current supply means connected to supply bias current to said impedance means for producing a voltage to charge said capacitor, said current supply means being connected to said breakdown device so that the bias current is diverted from said impedance means through said breakdown device in response to transfer of said breakdown device to a conducting condition, said control means producing a control signal in response to diversion of bias current therefrom.

9. A circuit as defined in claim 8 wherein said control means comprises a coil of a magnetic reed switch having contacts to be connected in a control circuit, said contacts being held normally closed by current supplied to said coil by said current supply means and being opened in response to diversion of current supplied from said current supply means.

10. An overload detection circuit comprising, detecting means adapted for energization by current to be sensed to produce an output voltage having a magnitude substantially proportional to the magnitude of the current to be sensed, a capacitor, impedance means including control means across said capacitor, a breakdown device connected in the discharge path for said capacitor and connected to respond to said output voltage, said breakdown device being transferred from a nonconducting condition to a conducting condition to effect discharge of said capacitor when said output voltage attains a predetermined value, current supply means connected to supply bias current to said impedance means for producing a voltage to charge said capacitor, said current supply means being connected to said breakdown device so that the bias current is diverted from said impedance means through said breakdown device in response to transfer of said breakdown device to a conducting condition, said control means producing a control signal in response to diversion of bias current therefrom, and additional control means in the discharge path of said capacitor for producing an additional control signal in response to discharge of said capacitor.

11. An overload detection circuit comprising, detecting means adapted for energization by current to be sensed to produce an output voltage having a magnitude substantially proportional to the magnitude of the current to be sensed, a capacitor, impedance means including control means across said capacitor, a breakdown device connected in the discharge path for said capacitor and connected to respond to said output voltage, said breakdown device being transferred from a nonconducting condition to a conducting condition to effect discharge of said capacitor when said output voltage attains a predetermined value, current supply means connected to supply bias current to said impedance means for producing a voltage to charge said capacitor, said current supply means being connected to said breakdown device so that the bias current is diverted from said impedance means through said breakdown device in response to transfer of said breakdown device to a conducting condition, said control means producing a control signal in response to diversion of bias current therefrom, said breakdown device remaining in a conducting condition when traversed by current having a magnitude greater than the holding current for said device, the magnitude of said bias current being selected to be greater than the holding current of said device, and reset means including a switch connected in series with said current supply means and in parallel with said impedance means effective when closed to interrupt bias current flow through said breakdown device.

12. A pulse power supply circuit comprising, an electronic valve, direct current input terminals for supplying current to said valve, said valve being effective when conducting to supply power to a load, and overload detection means for rendering said valve nonconducting in response to an overload condition of current supplied to said valve, said overload detection means including sensing means connected for energization by the current supplied to said valve for producing an output voltage having a magnitude substantially proportional to the magnitude of the current, a capacitor, means across said capacitor for producing a voltage to charge said capacitor, a breakdown device connected in the discharge path for said capacitor and connected to respond to said output voltage, said breakdown device being transferred from a nonconducting condition to a conducting condition to effect discharge of said capacitor when said output voltage attains a predetermined value, and control means included in the discharge path for said capacitor to produce a signal in response to discharge of said capacitor for rendering said valve nonconductive.

13. A circuit as defined in claim 12 wherein said sensing means includes a current transformer having a magnetic core, a primary winding on the core connected for energization by the current supplied to said valve, a secondary winding on the core, and a bias winding on the core connected for energization by a bias current to effect saturation of said core in the absence of current in said primary winding.

14. A pulse power supply circuit comprising, a semiconductor device, direct current input terminals connected to supply current to said semiconductor device, said semiconductor device being effective when conducting to supply power to a load, control means for effecting conduction of said semiconductor device, and overload detection means for rendering said semiconductor device nonconductive and for disabling said control means in response to an overload condition of current supplied to said semiconductor device, said overload detection means including sensing means connected for energization by the current supplied to said semiconductor device to produce an output voltage having a magnitude substantially proportional to the magnitude of the current, a capacitor, means across said capacitor for producing a voltage to charge said capacitor, a breakdown device connected in the discharge path for said capacitor and connected to respond to said output voltage, said breakdown device being rendered conductive to effect discharge of said capacitor when said output voltage attains a predetermined value, and means connected to be energized by breakdown of said breakdown device and discharge of said capacitor for rendering said semiconductor device nonconductive and for disabling said control means.

15. A pulse power supply circuit comprising, first and second semiconductor devices, direct current input terminals connected to supply current to said devices, said first device being effective when conducting to supply power to a load, a control circuit connect to said first device to effect conduction of said first device, a timing circuit and an overload detection means connected to detect the current supplied to said first device for rendering said second device conductive and for disabling said control circuit in response to an overload condition of current supplied to said first device, said detection means including a current transformer having a magnetic core, a primary winding on said core connected for energization by the current supplied to said first device, a bias winding on said core connected for energization by a bias current for effecting saturation of said core in the absence of current in said primary winding, and a secondary winding on said core; a capacitor, first impedance means including first control means connected across said capacitor in series with said bias winding for energization by the bias current to produce a voltage to charge said capacitor, a breakdown device connected to respond to voltage induced in said secondary winding and included in the discharge path for said capacitor, said breakdown device being rendered conductive when voltage induced in said secondary winding attains a predetermined value, and second control means included in the discharge path for said capacitor effective in response to discharge of said capacitor for rendering said second device conductive at a time determined by said timing circuit, means connected to said first and said second devices responsive to conduction of said second device to render said first device nonconducting, said bias winding being connected to said breakdown device so that bias current is diverted away from said first control means through said breakdown device in response to transfer of said breakdown device to a conducting condition, said first control means being effective in response to diversion of said bias current therefrom to disable said control circuit.

16. A pulse power supply circuit comprising, first and second controlled rectifiers, direct current input terminals connected to supply current to said rectifiers, said first rectifier being effective when conducting to supply power to a load, a control circuit connected to said first device to effect conduction of said first rectifier, a timing circuit and an overload detection means connected to detect the current supplied to said first rectifier for rendering said second rectifier conductive and for disabling said control circuit in response to an overload condition of current supplied to said first rectifier, said detection means including a current transformer having a magnetic core, a primary winding on said core connected for energization by the current supplied to said first rectifier, a bias winding on said core connected for energization by a bias current for effecting saturation of said core in the absence of current in said primary winding, and a secondary winding on said core; a capacitor, first impedance means including first control means connected across said capacitor in series with said bias winding for energization by the bias current to produce a voltage to charge said capacitor, a breakdown device connected to respond to voltage induced in said secondary winding and included in the discharge path for said capacitor, said breakdown device being rendered conductive when voltage induced in said secondary winding attains a predetermined value, and second control means included in the discharge path for said capacitor effective in response to discharge of said capacitor for rendering said second rectifier conductive at a time determined by said timing circuit, means connected to said first and second devices responsive to conduction of said second device to render said first device nonconducting, said bias winding being connected to said breakdown device so that bias current is diverted away from said first control means through said breakdown device in response to transfer of said breakdown device to a conducting condition, said first control means being effective in response to diversion of said bias current therefrom to disable said control circuit, said breakdown device remaining in a conducting condition when traversed by current having a magnitude greater than the holding current for said device, the magnitude of said bias current being selected to be greater than the holding current of said device, and reset means including a switch connected in series with said bias winding and in parallel with said first impedance means effective when closed to interrupt bias current flow through said device.

17. A pulse power supply circuit comprising, first and second controlled rectifiers, direct current input terminals connected to supply current to said rectifiers, said first rectifier being effective when conducting to supply power to a load, a control circuit connected to said first rectifier operable when energized to effect conduction of said first rectifier, a timing circuit and an overload detection means connected to detect the current supplied to for rendering said second rectifier conductive and for disabling said control circuit in response to an overload condition of current supplied to said first rectifier, said overload detection means including a current transformer having a magnetic core, a primary winding on said core connected for energization by the current supplied to said first rectifier, a bias winding on said core connected for energization by a bias current for effecting saturation of said core in the absence of current in said primary winding, and a secondary winding on said core; a capacitor, impedance means including first control means connected across said capacitor in series with said bias winding for energization by the bias current to produce a voltage to charge said capacitor, said first control means including a winding for a magnetic reed switch having contacts in said control circuit which are closed when said reed switch winding is energized, a PNPN diode breakdown device across said secondary winding and included in the discharge path for said capacitor, said breakdown device being rendered conductive when voltage induced in said secondary winding attains a predetermined value, and second control means in the discharge path for said capacitor including a second transformer for producing a signal to render said second rectifier conductive in response to discharge of said capacitor at a time determined by said timing circuit, means connected to said first and second rectifiers responsive to conduction of said second device to render said first device nonconducting, said bias winding being connected to said breakdown device so that bias current is diverted from said reed switch winding through said breakdown device in response to transfer of said breakdown device to a conducting condition whereby said reed switch winding is de-energized.

No references cited.

JOHN F. COUCH, *Primary Examiner.*

LLOYD McCOLLUM, *Examiner.*

W. H. BEHA, *Assistant Examiner.*